(12) United States Patent
Chang et al.

(10) Patent No.: US 7,777,936 B2
(45) Date of Patent: Aug. 17, 2010

(54) DISPLAY DEVICE

(75) Inventors: Jae-Hyuk Chang, Seongnam-si (KR);
Nam-Seok Roh, Seongnam-si (KR);
Seong-Sik Shin, Seongnam-si (KR);
Ju-Han Bae, Suwon-si (KR); Kyung-Ho Lee, Daejeon (KR); Jun-Bo Yoon, Daejeon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 106 days.

(21) Appl. No.: 12/166,436

(22) Filed: Jul. 2, 2008

(65) Prior Publication Data
US 2009/0168145 A1 Jul. 2, 2009

(30) Foreign Application Priority Data
Jan. 2, 2008 (KR) .................... 10-2008-0000328

(51) Int. Cl.
*G02B 26/00* (2006.01)
*G02F 1/15* (2006.01)

(52) U.S. Cl. ................ 359/291; 359/290; 359/247
(58) Field of Classification Search ......... 359/290–295, 359/298, 318, 237, 247, 223, 224
See application file for complete search history.

(56) References Cited

U.S. PATENT DOCUMENTS

| 5,933,204 | A  | * | 8/1999 | Fukumoto | .................... | 349/43 |
| 6,411,423 | B2 | * | 6/2002 | Ham | ......................... | 359/290 |
| 7,046,422 | B2 | * | 5/2006 | Kimura et al. | ............. | 359/295 |
| 7,227,525 | B2 | * | 6/2007 | Kishi | ......................... | 345/107 |

* cited by examiner

*Primary Examiner*—Mohammed Hasan
(74) *Attorney, Agent, or Firm*—H.C. Park & Associates, PLC (57) ABSTRACT

The present invention relates to a display device including a substrate having a display area, a first electrode disposed on the substrate to receive a first voltage, a second electrode disposed on the substrate to receive a second voltage having an opposite polarity to that of the first voltage, an insulating layer disposed on the first electrode and the second electrode, and an isolated member disposed on the insulating layer and electrically isolated, wherein an induction charge is generated in the isolated member by application of the first voltage and the second voltage, and wherein light transmittance is controlled according to the application of the first and second voltages.

21 Claims, 13 Drawing Sheets

DISPLAY DEVICE

CROSS-REFERENCE TO RELATED APPLICATION

This application claims priority from and the benefit of Korean Patent Application No. 10-2008-0000328, filed on Jan. 2, 2008, which is hereby incorporated by reference for all purposes as if fully set forth herein.

BACKGROUND OF THE INVENTION

1. Field of the Invention

The present invention relates to a display device. More particularly, the present invention relates to a display device using an electrostatic induction phenomenon to display images.

2. Discussion of the Background

A liquid crystal display (LCD), a plasma display panel (PDP), and an organic light emitting device (OLED) are among widely used flat panel displays.

The LCD is a display device using electro-optical characteristics of liquid crystals in which light transmission amounts are varied according to the intensity of an applied electric field to thereby realize the display of images. The PDP is a display device for displaying images using plasma generated by gas discharge. In the OLED, electrons and holes are injected into an organic illumination layer from a cathode (electron injection electrode) and an anode (hole injection electrode), respectively. The injected electrons and holes are combined to generate excitons, which illuminate when converting from an excited state to a ground state.

Recently, research regarding the manufacture of a display device having a simple structure, as well as improved performance, has been actively ongoing. Specifically, a display device capable of opening and closing a switching device using an electrostatic force and an elastic force to control when a pixel is turned ON/OFF has been researched.

To generate the electrostatic force, a high voltage may be applied to the switching device, but when the width of the signal transmitting line is narrow, the signal transmitting line may not be capable of enduring a high voltage such that the signal transmitting line may be burned. Therefore, the signal transmitting line should have a width that is larger than a specific size. However, when the signal transmitting line is wider, the area that is occupied by the signal transmitting line is increased, which may decrease the aperture ratio.

SUMMARY OF THE INVENTION

The present invention provides a display device that may have a simplified structure as compared to a conventional display device, without a reduction in the aperture ratio due to the signal line.

Additional features of the invention will be set forth in the description which follows, and in part will be apparent from the description, or may be learned by practice of the invention.

The present invention discloses a display device including a substrate having a display area, a first electrode disposed on the substrate to receive a first voltage, a second electrode disposed on the substrate to receive a second voltage having an opposite polarity to that of the first voltage, an insulating layer disposed on the first electrode and the second electrode, and an isolated member disposed on the insulating layer and electrically isolated. An induction charge is generated in the isolated member by the application of the first voltage and the second voltage, wherein light transmittance is controlled according to the application of the first and second voltages.

The isolated member may be a movable member that is deformed by an electrostatic attraction force with the first electrode and the second electrode according to the generation of the induction charge.

The central portion of the movable member may be disposed between the first electrode and the second electrode and may be fixed on the insulating layer, and the remaining portion of the movable member may be spaced apart from the insulating layer.

The movable member may be deformed from a curved surface state in which it partially overlaps the first electrode and the second electrode to a plane surface state in which it completely overlaps the first electrode and the second electrode.

The movable member may have a cross-sectional surface with a semi-circular shape or a semi-elliptical shape when the movable member does not have in the plane surface state.

Charges of the polarity that is opposite to that of the first electrode when it receives the first voltage may be induced at the portion of the movable member overlapping the first electrode and charges of the opposite polarity to that of the second electrode when it receives the second voltage may be induced at the portion of the movable member overlapping the second electrode, such that the movable member may be deformed.

The movable member returns to the curved surface state when the voltages applied to the first electrode and the second electrode are removed.

Light may be transmitted if the electrostatic attraction force is not generated to the movable member, and the light may be blocked if the electrostatic attraction force is generated.

The movable member may be made of a metal or a compound having elasticity. The movable member may comprises aluminum, gold, nickel, titanium, alloys thereof, or titanium nitride.

The present invention may further comprise a movable member connected to the first electrode and the second electrode and that is deformed by an electrostatic attraction force with the isolated member, the isolated member being a fixing electrode fixed on the insulating layer.

One end of the movable member may be fixed to the edge of the display area, and the other end of the movable member may have a curved surface shape such that the movable member covers the display area and may open the display area according to the electrostatic attraction force with the fixing member.

The movable member may include a first member connected to the first electrode, and a second member disposed at an interval from the first member and connected to the second electrode.

Charges of opposite polarity to that of the first member when it receives the first voltage are induced at one portion of the fixing electrode near the first member and charges of opposite polarity to that of the second member when it receives the second voltage are induced at the other portion of the fixing electrode near to the second member, such that the movable member is straightened by the electrostatic attraction force with the fixing electrode.

If the voltage applied to the movable member is removed, the one end portion of the movable member is fixed and the other end portion of the movable member may be returned to the curved surface shape by the elasticity thereof.

The isolated member disposed in each display area may be at least one thereof.

The insulating layer may include a color filter.

The display device may further include a separating layer disposed between the first electrode and the second electrode. The display device may further include a thin film transistor connected to the first electrode or the second electrode.

Therefore, a signal line to apply the voltage to the isolated member is not necessary to thereby simplify the structure of the display device. Furthermore, a space that would be occupied by the signal line connected to the isolated member is not necessary, thereby increasing the aperture ratio of the display device It is to be understood that both the foregoing general description and the following detailed description are exemplary and explanatory and are intended to provide further explanation of the invention as claimed.

DETAILED DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Now, a display device according to an exemplary embodiment of the present invention will be described in detail with reference to FIG. 1 and FIG. 2.

Figure 1:
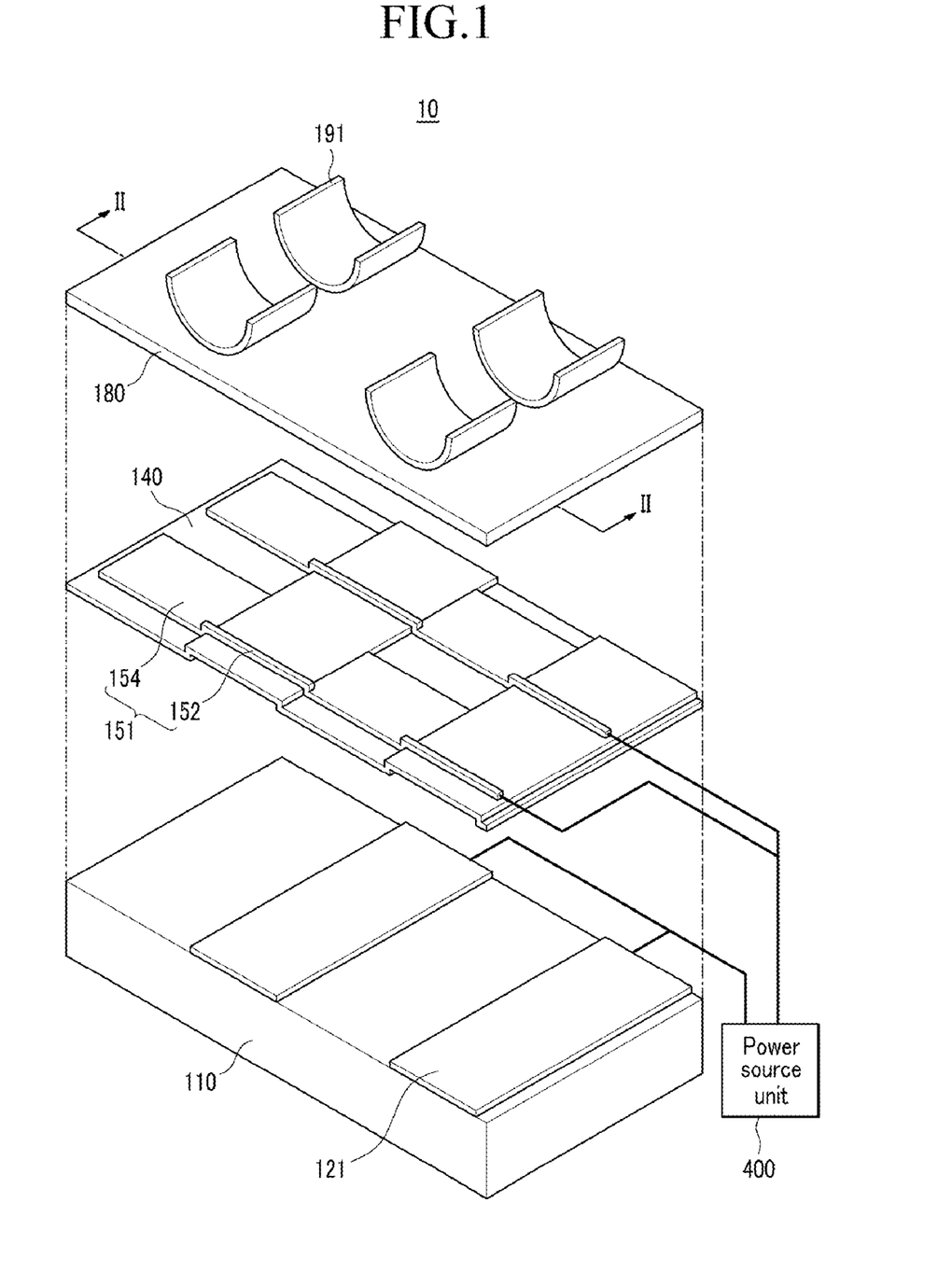
FIG. 1 is a perspective view of a display device according to an exemplary embodiment of the present invention.
Figure 2:
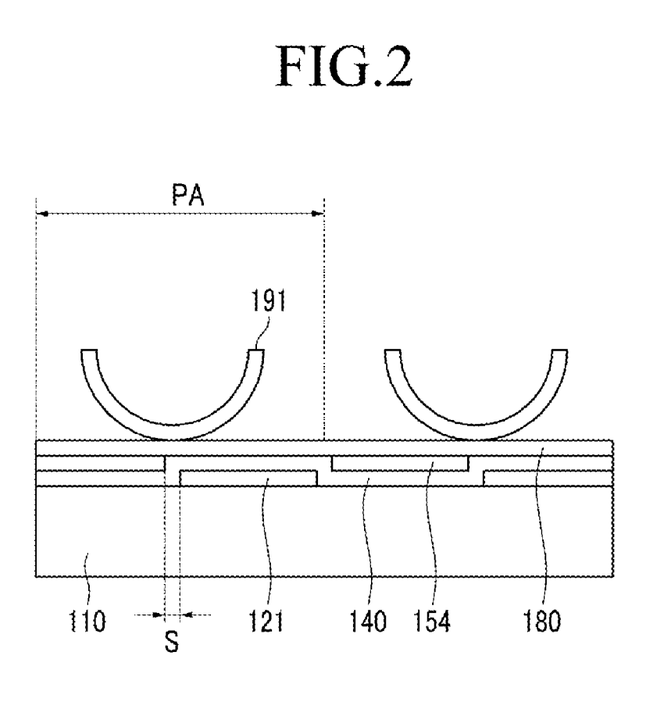
FIG. 2 is a cross-sectional view of the display device shown in FIG. 1 taken along line II-II.

FIG. 1 is a perspective view of a display device according to an exemplary embodiment of the present invention, and FIG. 2 is a cross-sectional view of the display device shown in FIG. 1 taken along line II-II.

Referring to FIG. 1 and FIG. 2, a display device 10 includes a plurality of first electrodes 121, a plurality of second electrodes 151, and a plurality of movable members 191 as isolating members.

The first electrodes 121 are disposed on a substrate 110 and extend in one direction. Two neighboring first electrodes 121 are arranged parallel to each other. A separating layer 140 is disposed on each first electrode 121. The separating layer 140 may be made of an inorganic material.

The second electrodes 151 are disposed on the separating layer 140, and each second electrode 151 includes a stem line 152 and a plurality of protrusion electrodes 154 protruding from the stem line 152. Each stem line 152 extends in a direction crossing the first electrodes 121, and the protrusion electrodes 154 do not overlap the first electrodes 121 and are each disposed between two of the first electrodes 121.

The protrusion electrodes 154 form a unit display area PA along with a portion of an adjacent first electrode 121. In the unit display area, the protrusion electrodes 154 and the first electrodes 121 are spaced apart by a distances. The first and second electrodes 121 and 151 are connected to a power source unit 400 to receive a voltage of a specific magnitude. The first and second electrodes 121 and 151 may be made of a transparent conductive material such as indium tin oxide (ITO) or indium zinc oxide (IZO). The first and second electrodes 121 and 151 may be made of doped silicon, a conductive polymer, or a metal, and they may be opaque.

An insulating layer 180 is disposed on the second electrodes 151. The insulating layer 180 may have a single-layered structure. Alternatively, the insulating layer 180 may have a dual-layered structure including an inorganic layer and an organic layer. The insulating layer 180 may be a color filter made of an organic material including pigments. In this case, the color filter may display one primary color, such as red, green, or blue. Alternatively, the color filter may be provided separate from the insulating layer 180.

The movable members 191 are disposed on the insulating layer 180 and have an elastic property. The movable members 191 may be substantially rectangular, and may have a curved surface as shown in FIG. 1 or a flat surface when they are extended. Central portions of the movable member 191 are fixed to the insulating layer 180, and are disposed between the protrusion electrodes 154 and the first electrodes 121. Most of each movable member 191 is not fixed to the insulating layer 180, but the central portion thereof is.

The movable members 191 are electrically floated. The movable members 191 maintain a curved state in the absence of an external electrostatic attraction, and a vertical section of the movable member 191 may approximate a semicircular shape. However, if voltages having opposite polarities are applied to the first and second electrodes 121 and 151, respectively, an attraction force is generated between the movable members 191 and the first and second electrodes 121 and 151 by electrostatic induction. Thus, both portions of the movable members 191 with respect to the central portions of the movable members 191 approach the insulating layer 180. If a sufficient attraction force is generated, the entire surface of the movable members 191 contacts the insulating layer 180 such that the movable members 191 cover the entire unit display area PA. If the voltages applied to the first and second electrodes 121 and 151 are removed, the movable members 191 return to their original shape because of an elastic force thereof.

The movable members 191 may be made of a metal that is opaque and elastic. For example, the movable member 191 may be made of aluminum, gold, nickel, titanium, or alloys thereof. Also, the movable member 191 may be made of titanium nitride. An insulating layer, which may be made of silicon dioxide ($SiO_2$) or aluminum oxide ($Al_2O_3$), may be disposed on the surface of each movable member 191. The display device may further include a blocking reflection material layer if the display device is a transmission type in which light that is incident under the display device is transmitted upwardly, or a reflection-improving material layer if the display device is a reflection type in which light that is incident on the display device is reflected. In the transmission display device, the first and second electrodes 121 and 151 should be transparent.

Figure 3:
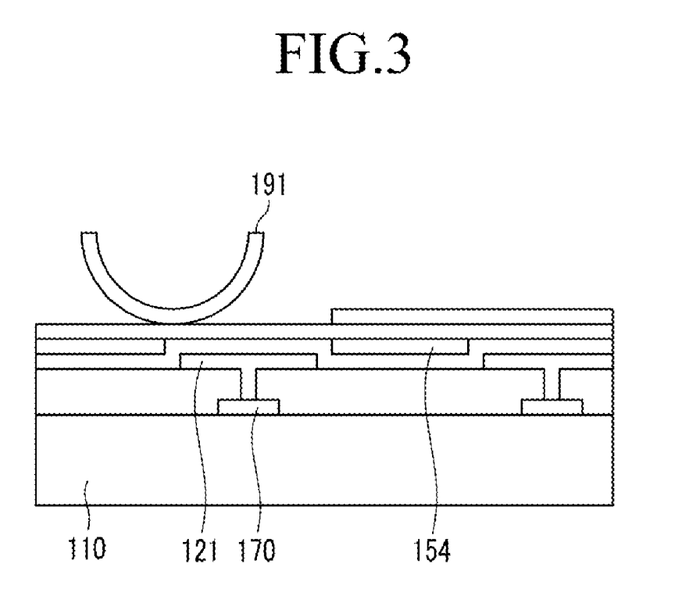
FIG. 3 is a cross-sectional view of a display device according to another exemplary embodiment of the present invention.

On the other hand, as shown in FIG. 3, the display device 20 may be adapted to an active matrix driving method. That is to say, the display device 20 may have at least one switching element connected to at least one of the electrodes 121 and 151, and it may independently switch the voltages applied to one of the electrodes 121 and 151.

As an example, switching elements, such as thin film transistors 170, may be disposed on the substrate 110 and connected to the first electrodes 121. In this case, gate lines (not shown) that transmit scanning signals that turn the thin film transistors 170 on and off and data lines (not shown) that transmit the voltages applied to the electrodes 121 and 151 may be arranged to cross each other on the substrate 110. The thin film transistor 170 may include a gate electrode, a source electrode, a drain electrode, and a semiconductor. The second electrode 151, which is not connected to the thin film transistor 170, may receive a common voltage. However, the functions of the first electrode 121 and the second electrode 151 may be exchanged.

On the other hand, two thin film transistors 170 may be disposed and respectively connected to the first and second electrodes 121 and 151. In this way, if the thin film transistors 170 are driven with the active driving method, the voltages applied to the electrodes 121 and 151 may be accurately controlled.

A light source unit (not shown) may be disposed under the substrate 110. The light source unit may include a light source, a light guide, and a reflection member. The light guide guides the light irradiated from the light source, and the reflection member reflects the light reflected by the light guide toward the direction of the unit display area to minimize the loss of the light. In the case of a reflective display device, the light source unit may be omitted.

A light blocking member to block light leakage may be disposed on the substrate 110. The light blocking member may be disposed on the other substrate, and color filters may be arranged together.

Next, a driving method of the display device 10 having the structure shown in FIG. 1 and FIG. 2 will be described with reference to FIG. 4 and FIG. 5.

Figure 4:
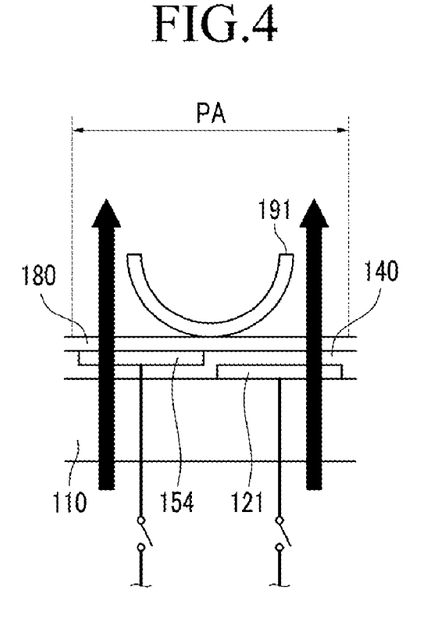
FIG. 4 and FIG. 5 are cross-sectional views showing unit display areas of the display devices shown in FIG. 1 and FIG. 2.
Figure 5:
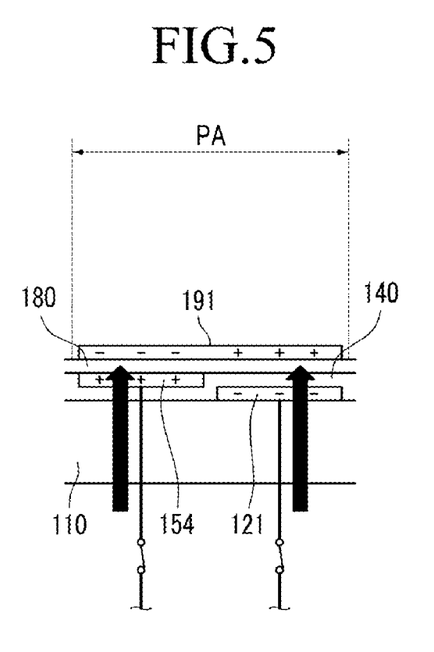

FIG. 4 and FIG. 5 are views showing unit display areas of the display device, where FIG. 4 represents a white state and FIG. 5 represents a black state.

As shown in FIG. 4, if sufficient potential differences do not exist between the first electrodes 121 and the protrusion electrodes 154, the movable members 191 maintain the circular state having the curved surface such that the unit display area PA is opened. Accordingly, the light irradiated from the light source is transmitted through the unit display area PA such that the unit display area PA achieves the white state.

As shown in FIG. 5, a negative voltage is applied to the first electrodes 121 and the protrusion electrodes 154 receive a positive voltage such that if sufficient potential differences are generated, positive charges are induced to one side of the movable members 191 near the first electrode 121, and negative charges are induced to the other side of the movable members 191 near the protrusion electrodes 154. Accordingly, the movable members 191 move and contact with the insulating layer 180 due to the attraction between the first electrodes 121/protrusion electrodes 154 and the movable members 191. Accordingly, the light irradiated from the light source is blocked by the movable members 191 and is not transmitted through the unit display area PA such that the unit display area PA achieves the black state. The positions of the movable members 191 may be determined by controlling the magnitudes of the voltages applied to the first electrodes 121 and the protrusion electrodes 154. The gray may be controlled according to the positions of the movable members 191. If the voltages applied to the first electrodes 121 and protrusion electrodes 154 are removed, the movable members 191 may return to their original positions due to an elastic force thereof.

According to the present exemplary embodiment, the display device 10 uses the elastic force of the movable members 191 and the electrostatic attraction by the electrostatic induction to control the white/black states of the unit display areas PA.

Next, a manufacturing method of the display device 10 shown in FIG. 1 and FIG. 2 will be described with reference to FIG. 6, FIG. 7, FIG. 8, FIG. 9, FIG. 10, FIG. 1, and FIG. 12 as well as FIG. 1 and FIG. 2.

FIG. 6, FIG. 7, FIG. 8, FIG. 9, FIG. 10, FIG. 11, and FIG. 12 are cross-sectional views of the display device in intermediate processes of sequentially manufacturing the display device shown in FIG. 1 and FIG. 2.

Figure 6:
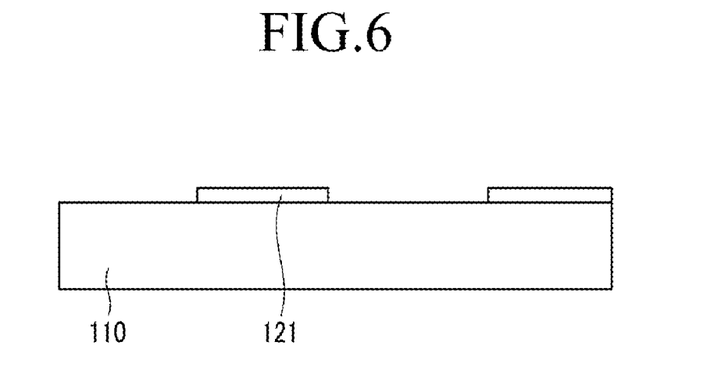
FIG. 6, FIG. 7, FIG. 8, FIG. 9, FIG. 10, FIG. 11, and FIG. 12 are cross-sectional views of the display device in an intermediate process of sequentially manufacturing the display device shown in FIG. 1 and FIG. 2.

Firstly, as shown in FIG. 6, the first electrodes 121, which may be made of a transparent conductive material such as ITO or IZO, are formed on a substrate 110.

Figure 7:
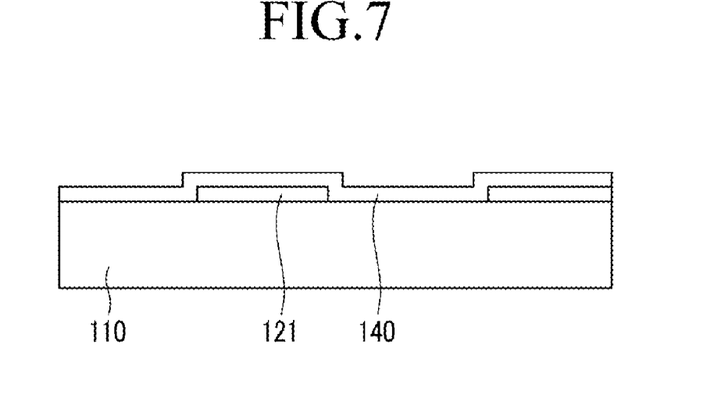
Figure 8:
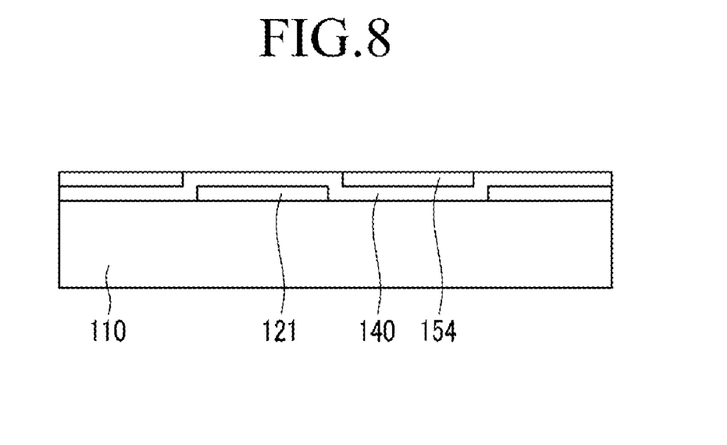

Next, as shown in FIG. 7, a separating layer 140, which may be made of a material such as silicon oxide or silicon nitride, is formed on the first electrodes 121. As shown in FIG. 8, the second electrodes 151, which may be made of a transparent conductive material such as ITO or IZO and include stem lines 152 and protrusion electrodes 154, are formed on the separating layer 140.

Figure 9:
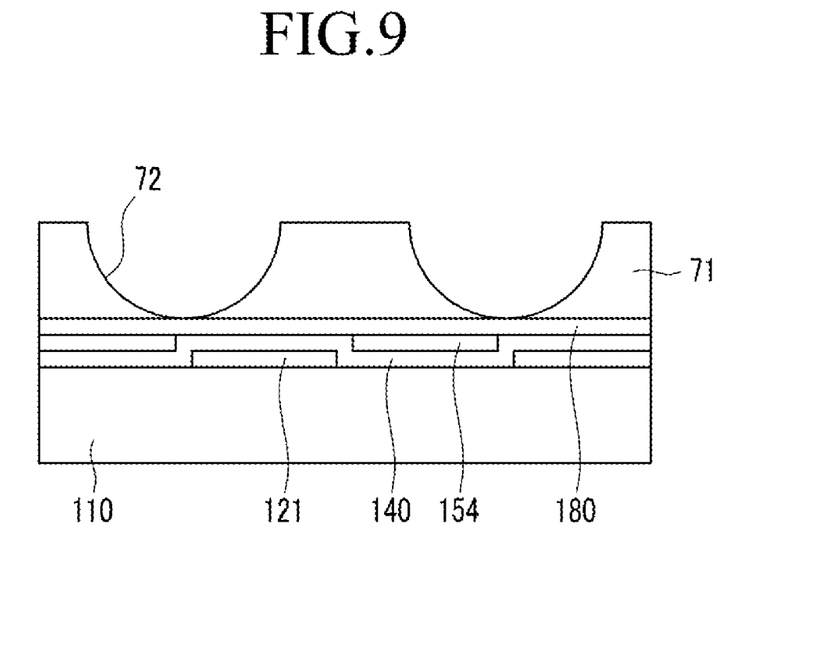

Then, as shown in FIG. 9, a photosensitive material is coated on the second electrodes 151 and the separating layer 140, and is exposed and developed to form the first photosensitive member 71 including recess portions 72.

Figure 10:
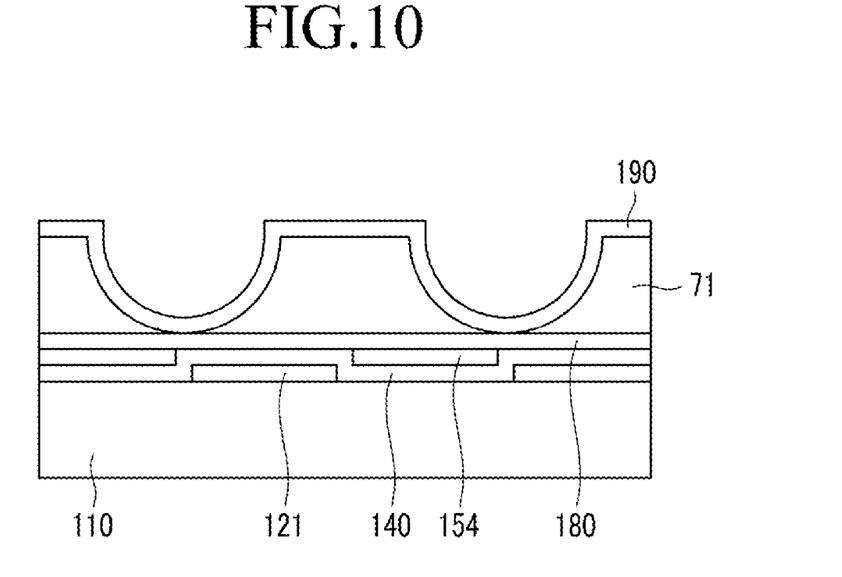
Figure 11:
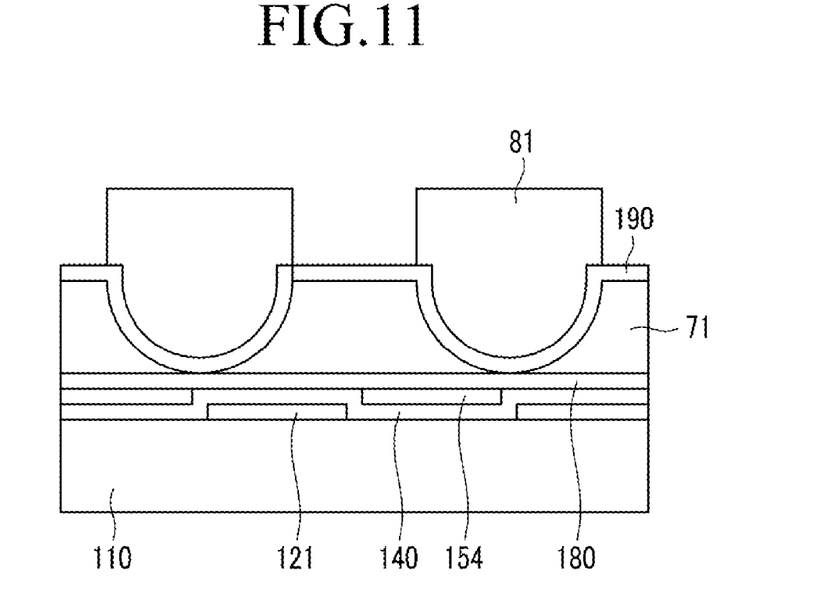

As shown in FIG. 10, a conductor layer 190 is then deposited on the first photosensitive member 71. Next, as shown in FIG. 11, a photosensitive material is coated, exposed, and developed to form a second photosensitive member 81 overlapping the recess portions 72.

Figure 12:
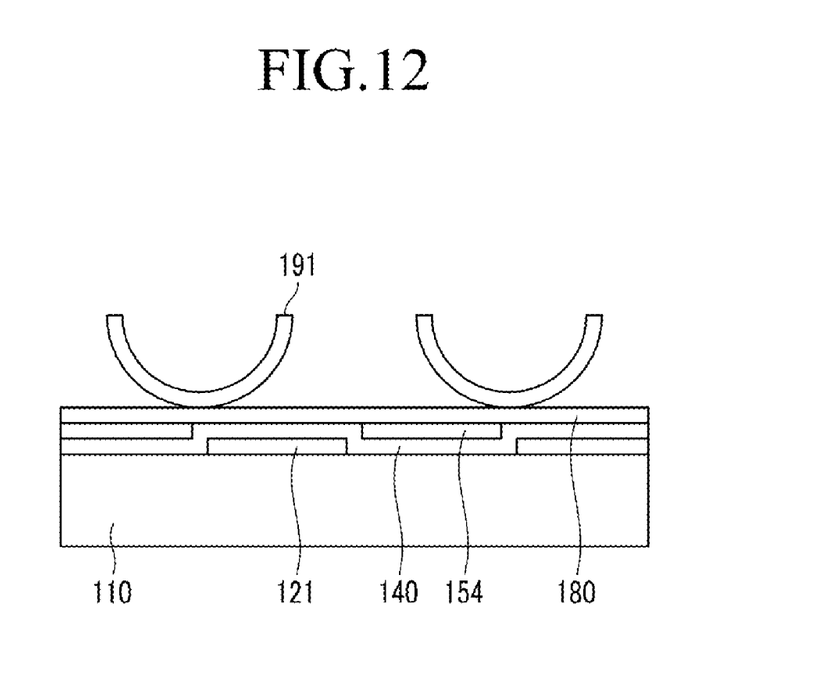

Subsequently, as shown in FIG. 12, the conductor layer 190 that is not covered by the second photosensitive member 81 is removed to form movable members 191 that are electrically isolated. The second photosensitive member 81 is then removed.

In this way, the movable members 191 according to the present exemplary embodiment are electrically isolated such that the process to form signal lines connected to the movable members 191 is not necessary. Accordingly, the manufacturing process of the display device 10 may be quick and simplified. Also, the reduction of the aperture ratio generated by the existence of signal lines connected to the movable members 191 may be eliminated.

Next, a display device according to another exemplary embodiment of the present invention will be described with reference to FIG. 13 and FIG. 14.

Figure 13:
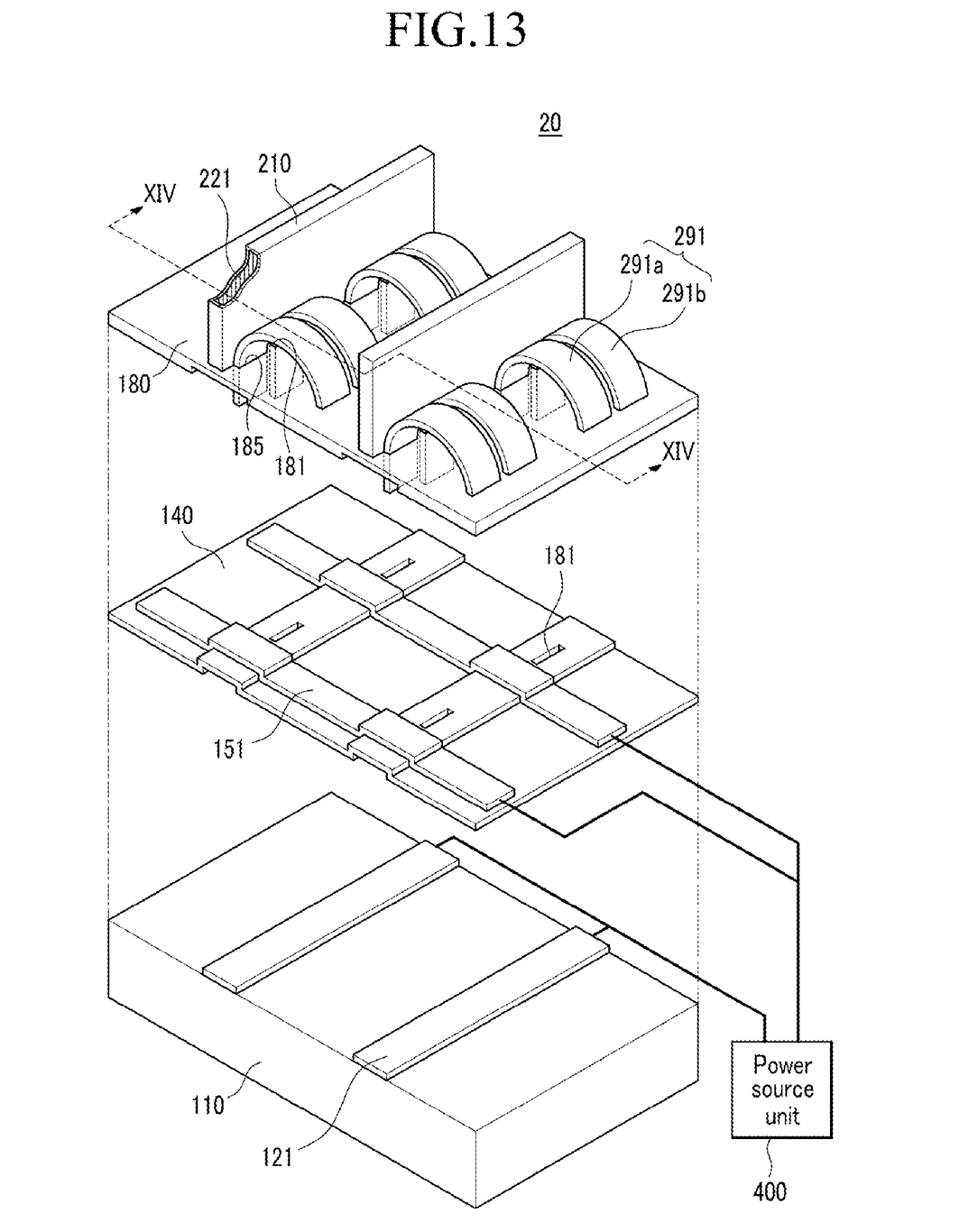
FIG. 13 is a perspective view of a display device according to another exemplary embodiment of the present invention.
Figure 14:
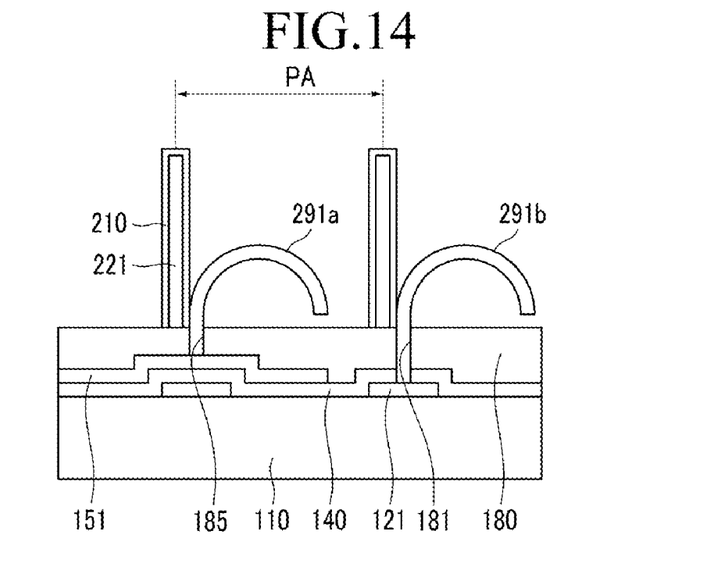
FIG. 14 is a cross-sectional view of the display device shown in FIG. 13 taken along line XIV-XIV.

FIG. 13 is a perspective view of a display device according to another exemplary embodiment of the present invention, and FIG. 14 is a cross-sectional view of the display device shown in FIG. 13 taken along line XIV-XIV.

Referring to FIG. 13 and FIG. 14, a display device 20 includes a plurality of first electrodes 121, a plurality of second electrodes 151, and fixing electrodes 221 and movable members 291 as isolated members.

The first electrodes 121 are disposed on a substrate 110 and extend in one direction. Two neighboring first electrodes 121 are arranged parallel to each other with an interval therebetween. A separating layer 140 is disposed the first electrode 121. The separating layer 140 may be made of an inorganic material.

The second electrodes 151 are disposed on the separating layer 140. The second electrodes 151 extend in a direction crossing the first electrodes 121 and have substantially the same shape as the first electrodes 121. Two neighboring second electrodes 151 are arranged parallel to each other with an interval therebetween. A unit display area PA is defined by two neighboring second electrodes 151 and two neighboring first electrodes 121.

The first and second electrodes 121 and 151 are connected to a power source unit 400 to receive a voltage of a specific magnitude. The first and second electrodes 121 and 151 may be made of a transparent conductive material, such as ITO or IZO. The first and second electrodes 121 and 151 may be made of doped silicon, a conductive polymer, or a metal, and may be opaque.

An insulating layer 180 is disposed on the second electrodes 151. The insulating layer 180 may have a single-layered structure. Alternatively, the insulating layer 180 may have a dual-layered structure of an inorganic layer and an organic layer. The insulating layer 180 may be a color filter made of an organic material including pigments. The color filter may display one of primary colors such as three primary colors of red, green, and blue. Alternatively, the color filter may be separate from the insulating layer 180. The insulating layer 180 has the first contact hole 185 exposing the second electrode 151. The insulating layer 180 and the separating layer 140 have a second contact hole 181 exposing the first electrode 121.

The fixing electrode 221 and the movable members 291 are fixed on the insulating layer 180.

The fixing electrode 221 is disposed in the edge of the unit display area PA and is electrically isolated. The fixing electrode 221 may be made of a material, such as a conductor or a dielectric material, and may have a cross-sectional surface of an approximate rectangular shape. However, the cross-sectional surface of the fixing electrode 221 may have various shapes.

An insulating covering 210, which may be made of silicon oxide ($SiO_2$) or aluminum oxide ($Al_2O_3$), is disposed at the surface of the fixing electrode 221.

The movable members 291 include first members 291a and second members 291b. The first members 291a and the second members 291b are insulated from the fixing electrode 221, and one end of each of the first member 291a and the second member 291b are disposed parallel to the side of the same fixing electrode 221. The first member 291a and the second member 291b have a size corresponding to the unit display area, and are electrically separated from each other by an interval. The first member 291a is connected to the second electrode 151 through the first contact hole 185, and receives a positive voltage from the second electrode 151. The second member 291b is connected to the first electrode 121 through the second contact hole 181, and receives a negative voltage from the first electrode 121. The polarities of the first electrode 121 and the second electrode 151 may be reversed.

The movable members 291 may have a bent surface. Particularly, in the present exemplary embodiment, the vertical section of the movable members 291 has an approximately semi-circular shape. The vertical section of the movable members 291 may have the approximately semi-circular shape or an oval shape. However, if sufficient voltages respectively having opposite polarities are applied to the first member 291a and the second member 291b through the first and second electrodes 121 and 151, an attraction force is generated by electrostatic induction between the fixing electrode 221 and the movable member 291. Thus, the movable member 291 approaches the fixing electrode 221. If a sufficient attraction force is generated, the whole surface of the movable member 291 contacts with the insulating covering 210 such that the unit display area PA is opened. Again, if the voltages applied to the movable members 291 are removed, the movable members 291 return to their original positions.

The movable members 291 may be made of a metal having elasticity. For example, the movable members 291 may be made of aluminum, gold, nickel, titanium, or alloys thereof. Alternatively, the movable member 291 may be made of titanium nitride. The display device 30 according to the present exemplary embodiment is a transmission type, such that the movable members 291 are opaque. The insulating covering may be disposed on the surface of the movable members 291, and a reflection blocking material layer may be added. The movable member 291 may be adapted to a reflection display device, and a reflection improvement material layer may be disposed on the surface of the movable members 291.

On the other hand, the display device may use an active matrix driving method using thin film transistors.

The various characteristics of the display device shown in FIG. 1, FIG. 2, and FIG. 3 may be applied to the present exemplary embodiment.

Next, a driving method of the display device 20 having the structure shown in FIG. 13 and FIG. 14 will be described with the reference to FIG. 15 and FIG. 16.

Figure 15:
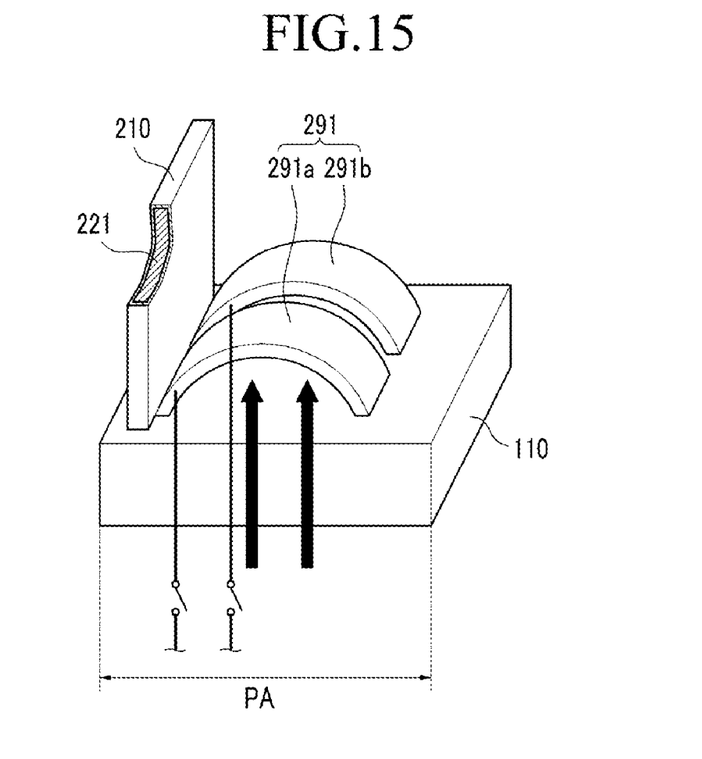
FIG. 15 and FIG. 16 are perspective views showing unit display areas of the display device shown in FIG. 13 and FIG. 14.
Figure 16:
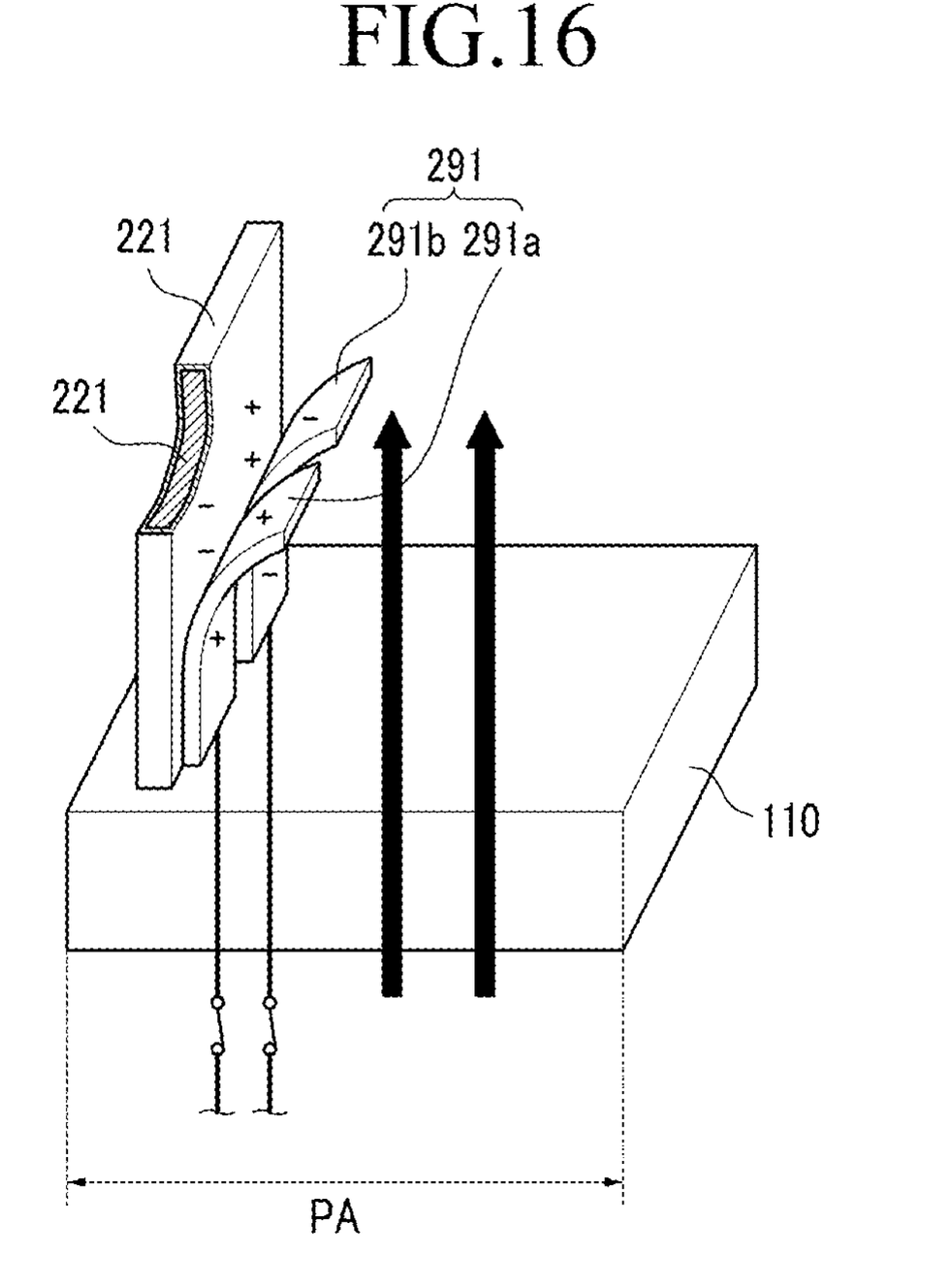

FIG. 15 and FIG. 16 are perspective views showing unit display areas of the display device, and FIG. 15 represents a black state and FIG. 16 represents a white state.

One movable member 291 including the portion of the fixing electrode 221, and the first member 291a and the second member 291b, is disposed in the unit display area PA.

As shown in FIG. 15, if the voltage is not applied to the movable member 291, the movable member 291 maintains a circular state having the bent surface such that the light transmitted through the unit display area PA is blocked.

As shown in FIG. 16, if a positive voltage is applied to the first member 291a of the movable member 291 and a negative voltage is applied the second member 291b thereof, negative charges are induced to one side portion of the fixing electrode 221 near to the first member 291a and positive charges are induced to the other side portion of the fixing electrode 221 near the second member 291b. Accordingly, the movable members 291 move due to the attraction force between the movable member 291 and the fixing electrode 221. The position of the movable members 291 may be determined by controlling the magnitude of the voltage applied to the movable members 291. The grays may be controlled according to the positions of the movable members 291. If the voltage applied to the movable member 291 is removed, the movable members 291 may return to their original positions due to an elastic force thereof.

Accordingly, the display device 30 according to the present exemplary embodiment controls the white/black states of the unit display area PA by using the elastic force of the movable members 291 and the electrostatic attraction force through electrostatic induction.

Next, the manufacturing method of the display device 20 shown in FIG. 13 and FIG. 14 will be described in detail with the reference to FIG. 17, FIG. 18, FIG. 19, FIG. 20, FIG. 21, and FIG. 22 as well as FIG. 13 and FIG. 14.

FIG. 17, FIG. 18, FIG. 19, FIG. 20, FIG. 21, and FIG. 22 are cross-sectional views of the display device in an intermediate process of sequentially manufacturing the display device shown in FIG. 13 and FIG. 14.

Figure 17:
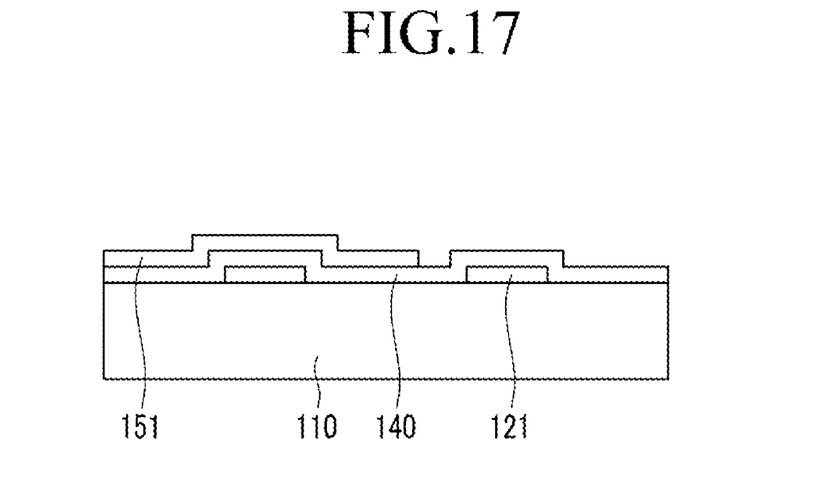
FIG. 17, FIG. 18, FIG. 19, FIG. 20, FIG. 21, and FIG. 22 are cross-sectional views of the display device in an intermediate process of sequentially manufacturing the display device shown in FIG. 13 and FIG. 14.

Firstly, as shown in FIG. 17, the first electrode 121, a separating layer 140, and the second electrode 151 are sequentially disposed on a substrate 110.

Figure 18:
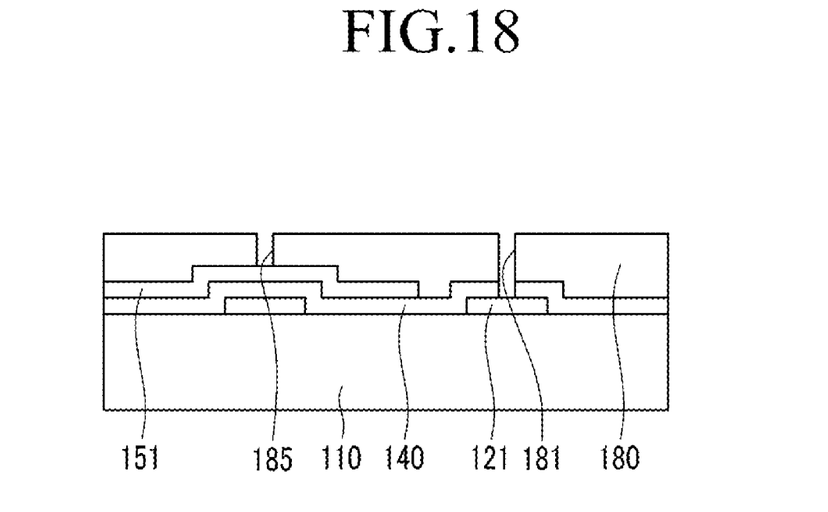

Next, as shown in FIG. 18, an insulating layer 180 is deposited on the second electrode 151 and the separating layer 140, and patterned to form the first contact hole 185 exposing the second electrode 151 and the second contact hole 181 exposing the first electrode 121.

Figure 19:
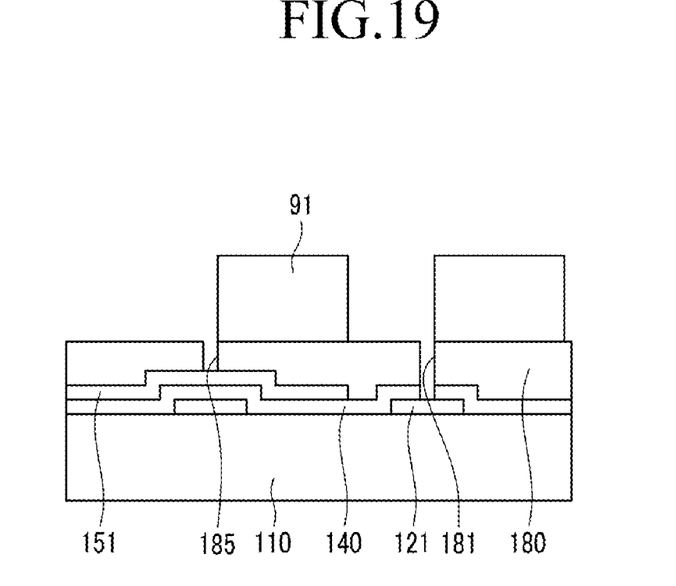
Figure 20:
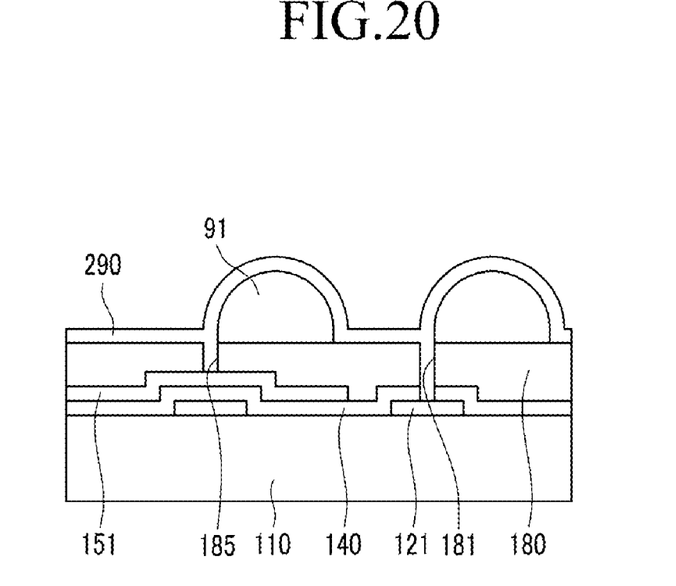

Then, as shown in FIG. 19, the photosensitive material is coated, exposed, and developed to form a third photosensitive member 91 having a cross-sectional surface of a rectangular shape. As shown in FIG. 20, a reflow process is then executed to the third photosensitive member 91 while heating such that the cross-sectional surface of the third photosensitive member 91 becomes an approximate semi-circular or semi-elliptical shape. Next, an opaque metal layer 290 is deposited on the third photosensitive member 91 using electroplating, electroless plating, or sputtering.

Figure 21:
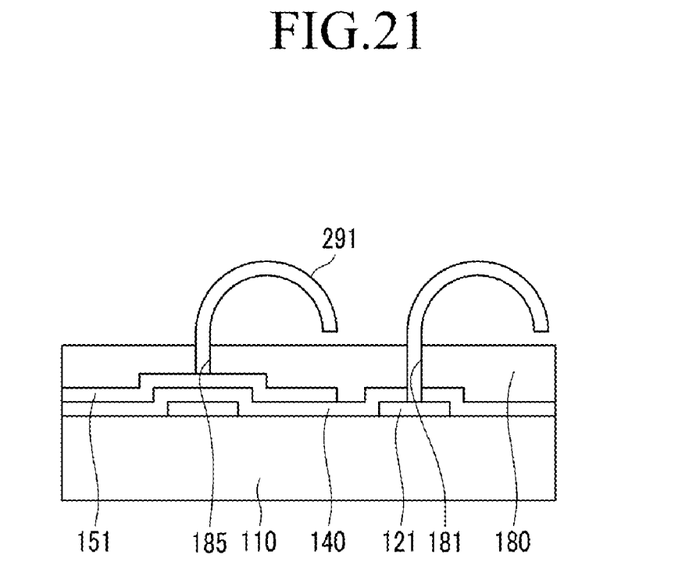

Next, as shown in FIG. 21, a portion of the metal layer 290 is removed using a mask made of a photosensitive material. The third photosensitive member 91 is then removed. Accordingly, the movable members 291, which may have a vertical section with a semicircular shape or a semi-elliptical shape, are completed.

Figure 22:
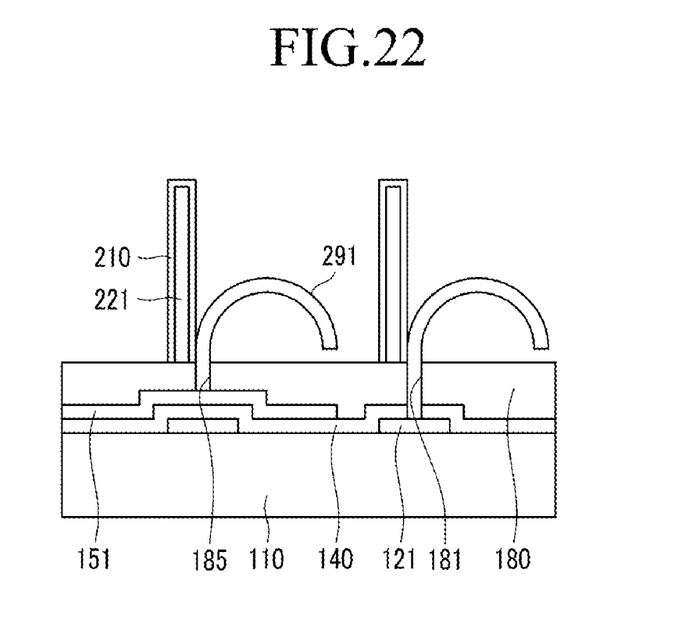

Subsequently, as shown in FIG. 22, fixing electrodes 221 and an insulating covering 210 covering them 221 are formed. This process may be undertaken before coating the photosensitive material on the insulating layer 180, as shown in FIG. 19.

In this way, the fixing electrodes 221 according to the present exemplary embodiment are electrically isolated such that the process for forming an electrode or a signal line connected thereto is not necessary. Accordingly, the manufacturing process of the display device 30 may be quick and simplified. Also, a reduction of the aperture ratio due to an electrode or a signal line connected to the fixing electrodes 221 may be prevented.

Next, a display device according to another exemplary embodiment of the present invention will be described with reference to FIG. 23.

Figure 23:
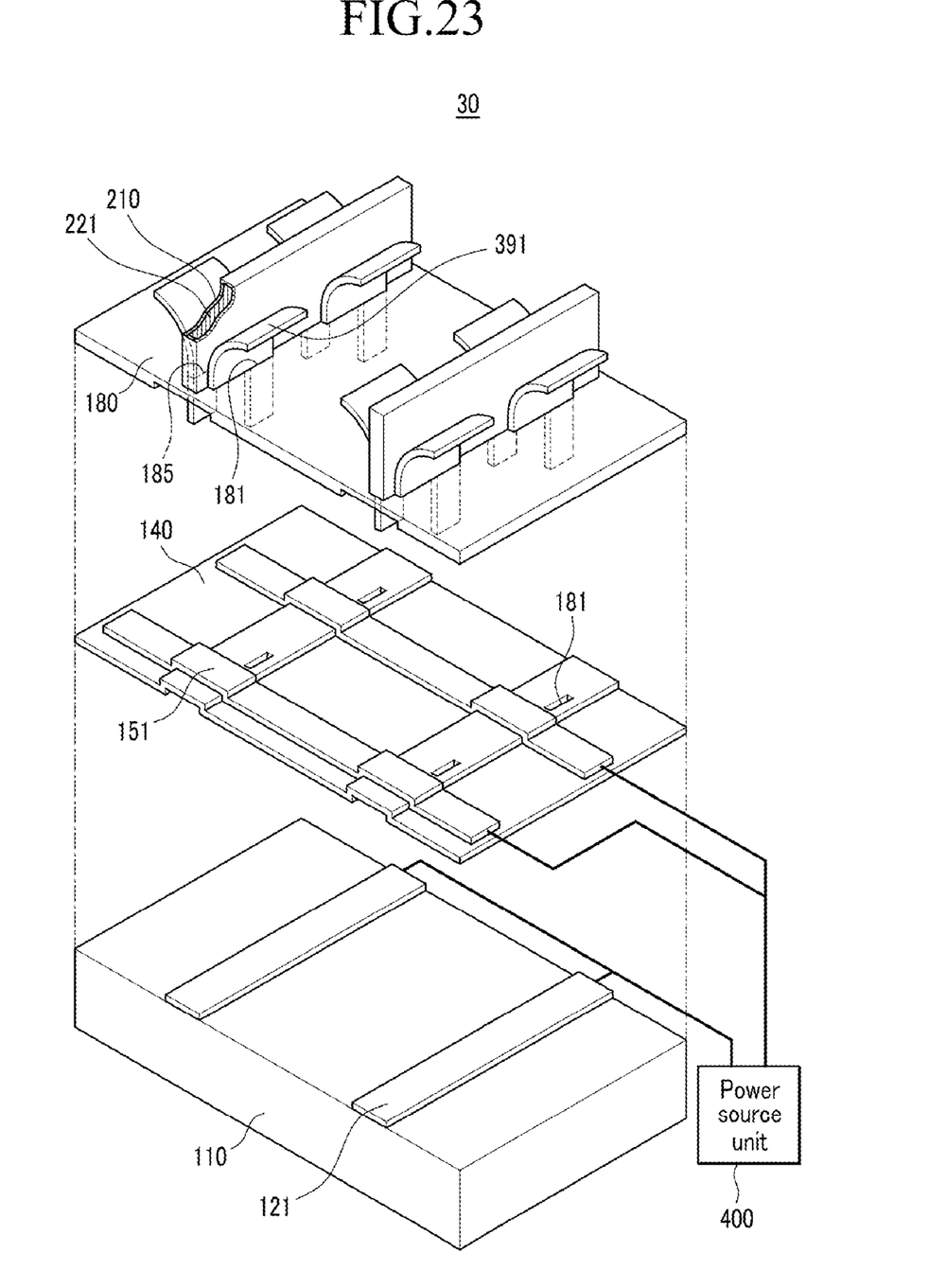
FIG. 23 is a perspective view of a display device according to another exemplary embodiment of the present invention.

FIG. 23 is a perspective view of a display device according to another exemplary embodiment of the present invention.

Referring to FIG. 23, a display device 30 includes a substrate 110, a plurality of first electrodes 121, a separating layer 140, a plurality of second electrodes 151, an insulating layer 180, a fixing electrode 221 as an isolating member, a power source unit 400, and a movable member 391.

The structures of the first and second electrodes 121 and 151 disposed on the substrate 110, the separating layer 140 to separate the first electrodes 121 and the second electrodes 151, the power source unit 400 connected to the first electrodes 121 and the second electrodes 151, the insulating layer 180 disposed on the second electrodes 151, and the fixing electrodes 221 disposed on the insulating layer 180 are the same as those of the exemplary embodiment shown in FIG. 13 and FIG. 14.

However, in the display device 30 according to the present exemplary embodiment, different from the display device 30 of FIG. 13 and FIG. 14, two movable members 391 are opposite to each other in the unit display area PA. The two movable members 391 are disposed next to two neighboring fixing electrodes 221, and are respectively connected to the first electrode 121 and the second electrode 151. The vertical section of the movable members 391 has an approximate quadrant shape, and the vertical section of two movable members 391 that are opposite to each other has a disconnected semi-circular shape.

If the voltage is not applied to the two movable members 391, the unit display area PA is covered such that the transmitting light is blocked. However, if the voltage is applied to the two movable members 391, the two movable member 391 approach the direction of the fixing electrodes 221 that are disposed close to the two movable members 391 such that the unit display area PA is opened. The transmittance of the light may be controlled by controlling the magnitude of the voltages applied to the movable members 391. The movable members 391 are made of an opaque metal having elasticity. A reflection blocking material layer may be disposed on the surface of the movable members 391. However, in the case of a reflection display device, a reflection improving material layer may be disposed on the surface of the movable members 391.

Numerous advantages of the exemplary embodiment shown in FIG. 13 and FIG. 14 can be applied identically to the present exemplary embodiment.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
 a substrate having a display area;
 a first electrode disposed on the substrate to receive a first voltage;
 a second electrode disposed on the substrate to receive a second voltage having an opposite polarity to that of the first voltage;
 an insulating layer disposed on the first electrode and the second electrode; and
 an isolated member disposed on the insulating layer and electrically isolated,
 wherein an induction charge is generated in the isolated member by the application of the first voltage and the second voltage,
 wherein the isolated member is a movable member that is bent by an electrostatic attraction force with the first electrode and the second electrode according to the generation of the induction charge, and
 wherein light transmittance is controlled according to the application of the first voltage and the second voltage.

2. The display device of claim 1, wherein
 the central portion of the movable member is disposed between the first electrode and the second electrode and is fixed on the insulating layer, and the remaining portion of the movable member is spaced apart from the insulating layer.

3. The display device of claim 2, wherein the movable member is deformed from a curved surface state in which it partially overlaps the first electrode and the second electrode to a plane surface state in which it completely overlaps the first electrode and the second electrode.

4. The display device of claim 3, wherein the movable member has a cross-sectional surface with a semi-circular shape or a semi-elliptical shape when the movable member is not in the plane surface state.

5. The display device of claim 3, wherein charges of opposite polarity to that of the first electrode when it receives the first voltage are induced at a portion of the movable member overlapping the first electrode and charges of opposite polarity to that of the second electrode when it receives the second voltage are induced at a portion of the movable member overlapping the second electrode, such that the movable member is deformed.

6. The display device of claim 5, wherein the movable member returns to the curved surface state when the voltages applied to the first electrode and the second electrode are removed.

7. The display place of claim 1, wherein the light is transmitted if the electrostatic attraction force is not generated, and the light is blocked if the electrostatic attraction force is generated.

8. The display device of claim 1, wherein the movable member is made of a metal or a compound having elasticity.

9. The display device of claim 8, wherein the movable member comprises aluminum, gold, nickel, titanium, alloys thereof, or titanium nitride.

10. The display device of claim 1, wherein at least one isolated member is disposed in each display area.

11. The display device of claim 1, wherein the insulating layer comprises a color filter.

12. The display device of claim 1, further comprising a separating layer disposed between the first electrode and the second electrode.

13. The display device of claim 1, further comprising:
a thin film transistor connected to the first electrode or the second electrode.

14. A display device comprising:
a substrate having a display area;
a first electrode disposed on the substrate to receive a first voltage;
a second electrode disposed on the substrate to receive a second voltage having an opposite polarity to that of the first voltage;
an insulating layer disposed on the first electrode and the second electrode;
an isolated member disposed on the insulating layer and electrically isolated; and
a movable member connected to the first electrode and the second electrode,
wherein the movable member is bent by the electrostatic attraction force with the isolated member, and the isolated member is a fixing electrode fixed on the insulating layer,
wherein an induction charge is generated in the isolated member by the application of the first voltage and the second voltage, and
wherein light transmittance is controlled according to the application of the first voltage and the second voltage.

15. The display device of claim 14, wherein one end of the movable member is fixed to the edge of the display area and the other end of the movable member has a curved surface shape such that the movable member covers the display area, and opens the display area according to the electrostatic attraction force with the fixing member.

16. The display device of claim 15, wherein the movable member comprises:
a first member connected to the first electrode; and
a second member disposed at an interval from the first member and connected to the second electrode.

17. The display device of claim 16, wherein charges of opposite polarity to that of the first member when it receives the first voltage are induced at one portion of the fixing electrode near the first member and charges of opposite polarity to that of the second member when it receives the second voltage are induced at the other portion of the fixing electrode near to the second member, such that the movable member is straightened by the electrostatic attraction force with the fixing electrode.

18. The display device of claim 17, wherein if the voltage applied to the movable member is removed, one end portion of the movable member is fixed and the other end portion of the movable member is returned to the curved surface shape by the elasticity thereof.

19. The display device of claim 14, wherein the movable member is made of a metal or a compound having elasticity.

20. The display device of claim 19, wherein the movable member comprises aluminum, gold, nickel, titanium, alloys thereof, or titanium nitride.

21. The display device of claim 14, wherein the movable member disposed in each display area comprises at least two pieces.

* * * * *